Oct. 1, 1963    L. O. STEBBINS    3,105,380
APPARATUS FOR INSPECTION OF METAL PIPE
Filed April 3, 1961    2 Sheets-Sheet 2
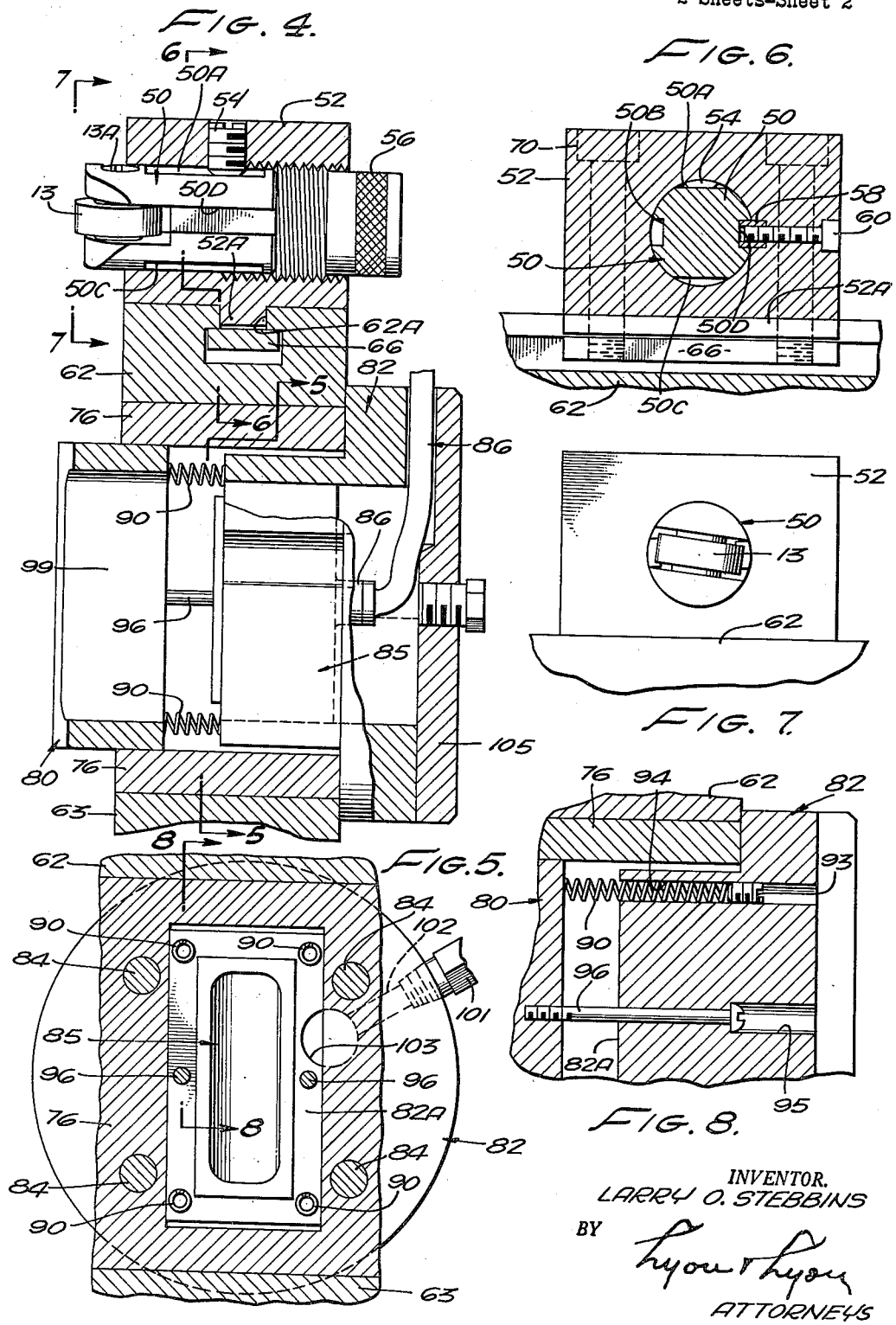
INVENTOR.
LARRY O. STEBBINS
BY
Lyon & Lyon
ATTORNEYS United States Patent Office 3,105,380
Patented Oct. 1, 1963

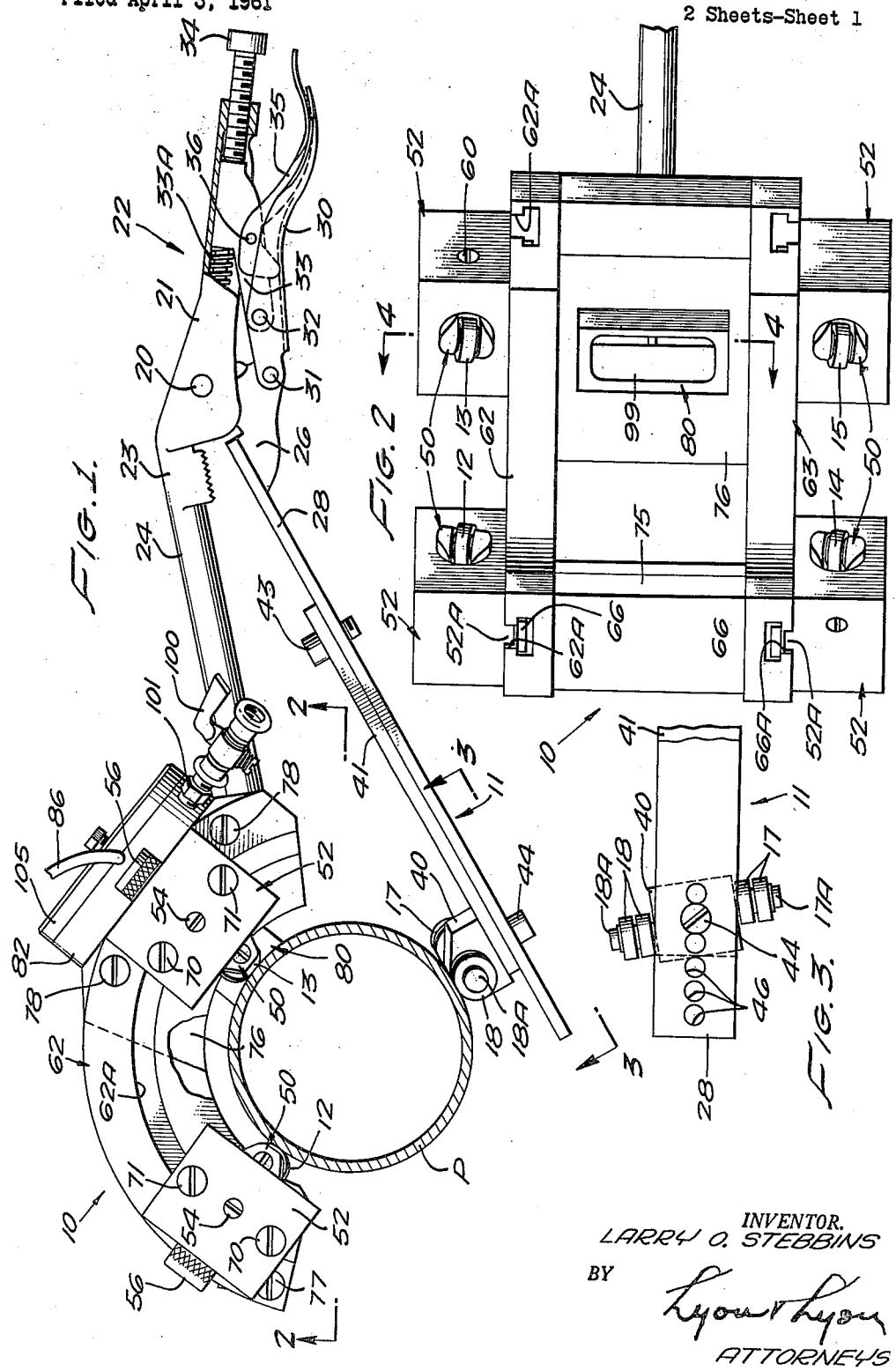

3,105,380
APPARATUS FOR INSPECTION OF METAL PIPE
Larry O. Stebbins, Temple City, Calif., assignor, by mesne assignments, to Automation Industries, Inc., El Segundo, Calif., a corporation of California
Filed Apr. 3, 1961, Ser. No. 100,216
8 Claims. (Cl. 73—67.8)

The present invention relates to apparatus useful in the inspection of metals for flaws and/or changes in its wall thickness, and the same is particularly useful in inspection of metal pipe.

The apparatus described herein is intended for use in a metal inspection system wherein pulsed energy is periodically transmitted through the metal under inspection and returning echo signals are either observed or recorded or used to provide other information whereby either the presence of flaws or excessive thinness of the metal may be determined. Such a system is described in the copending patent application of Larry O. Stebbins, filed April 3, 1961, Serial No. 100,217, and assigned to the same assignee as the present application, and is particularly useful therein.

In a system such as described in the above copending application, a crystal or transducer is used in transmitting the pulsed energy and also for receiving the returning echo signals, and also a water column is interposed between the crystal and the metal test piece for not only providing good coupling between the test piece and the crystal but also for the two-way transmission of the transmitted and reflected pulses. The apparatus described herein incorporates such a crystal and means whereby the desired water column may be established. Further, the apparatus is so constructed as to be readily mounted in operative relationship with respect to tubular metal test pieces such as pipes found in the oil industry for the ready inspection of the same when the pipe is rotated with respect to the apparatus.

An important structural feature of the apparatus is that when and as the pipe is rotated about its own axis, the apparatus travels automatically in a direction parallel to the rotational axis so that in effect the crystal "scans" the rotating pipe along a spiral path.

It is therefore an object of the present invention to provide apparatus of this character having one or more of the above-indicated features.

Another object of the present invention is to provide apparatus of this character which may be easily and readily mounted on pipe.

Another object of the present invention is to provide apparatus of this character incorporating means whereby the same is adjustable for pipes of different diameter.

Another object of the present invention is to provide apparatus of this character that incorporates unique means whereby the crystal carried thereon "scans" along a spiral path in response to rotation of the pipe about its own axis.

Another object of the present invention is to provide apparatus of this character which in effect incorporates an expansible water chamber which provides some compensation for unevenness of the outer surface of the pipe as well as variations in the outer diameter of the pipe.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a side elevational view of apparatus embodying the present invention shown in its clamped condition on a pipe under inspection.

FIGURE 2 is a view in elevation taken generally in the direction indicated by the arrows 2—2 in FIGURE 1.

FIGURE 3 is an elevational view taken generally in the direction indicated by the arrows 3—3 in FIGURE 1.

FIGURE 4 is generally a sectional view taken substantially along the line 4—4 in FIGURE 2.

FIGURES 5, 6 and 7 are views taken generally along the corresponding lines 5—5, 6—6 and 7—7 in FIGURE 4.

FIGURE 8 is generally a sectional view taken along the line 8—8 in FIGURE 5.

The apparatus is arranged to incorporate means whereby the same is clamped onto the metal pipe P so as to be supported thereon. For this purpose the apparatus incorporates two clamping jaw members 10 and 11, the member 10 having four spaced pipe-engaging rollers 12, 13, 14 and 15 (FIGURE 2) mounted thereon, and the other jaw member 11, as illustrated in FIGURES 1 and 3, having two pipe-engaging rollers 17 and 18 thereon.

The jaw member 11 is pivotally mounted with respect to jaw member 10 for movement about the axis of a pivot pin 20 mounted on the handle 21, the handle 21 being an extension of the jaw member 10.

Suitable means are provided for locking the jaw members 10 and 11 in their clamping condition as illustrated in FIGURE 1, and as illustrated therein, such means is a commercially available clamp having an over-center toggle mechanism incorporated therein, such clamp 22 having one of its jaws 23 welded to the rod 24 forming a welded extension of the jaw member 10, the other jaw 26 of this commercially available clamp 22 having welded thereto the bar 28 so as to provide the extended jaw member 11.

The clamp 22 incorporates the handle portion 21 and the manually movable locking lever 30 having one of its ends pin-connected at 31 to the jaw member 26, an intermediate portion of such lever 30 being pin-connected at 32 to one end of the toggle bar 33. The other end of the toggle bar 33, in conventional manner, is spring-biased to the left in FIGURE 1 by a coil compression spring 33A encased in the handle 21, the force exerted by such spring being adjusted to some extent by the knurled bolt 34 threaded in the handle member 21 which also establishes within a certain range the spacing between jaws 23 and 26 at which the toggle bar 33 moves past an over-center position to effect the clamping action.

An unlocking lever 35 is pin-connected at 36 to the toggle bar 33 and is movable into engagement with the locking lever 30 to pivot the same in the clockwise direction in FIGURE 1 about its pivot pin 31 to move the toggle bar 33 past its center position and cause the clamp to open under the influence of the self-contained spring 33A.

In the closed position of the clamp as illustrated in FIGURE 1, the spring in the clamp 22 is effective to resiliently press the jaw members 10 and 11 together so as to constantly maintain the jaw rollers in contact with the pipe P even though there may be variations in the outer diameter of the pipe P.

These previously-mentioned pipe-engaging rollers are adjustably mounted in their corresponding jaw members such that their outer portions may lie on circles of different diameters corresponding to different diameter pipes.

For this purpose the rollers 17 and 18 are rotatably mounted on corresponding shafts 17A and 18A extending from opposite sides of the mounting block 40 welded on bar 41, the bar 41 being adjustably positioned on bar 28 by set screws 43 and 44 passing through a corresponding one of a plurality of selectable holes typified at 46 in FIGURE 3. Preferably these holes 46 extending along the axis of the bar 28 are each suitably marked in accordance with the corresponding diameter of the pipe so that the user may readily choose the particular hole, knowing the diameter of the pipe to be inspected.

The means whereby the other rollers 12, 13, 14 and 15 in the other jaw member 10 may be individually adjusted to properly contact the pipe is now described in relation to FIGURES 4 and 6 which are illustrative of each of these four individual adjustments.

As shown in FIGURE 4, the roller 13 is rotatable about the axis of pin 13A (which may have screw-threaded portions) passing through spaced legs of roller-supporting post 50 which is generally circular in cross-section but which has four longitudinally extending outer grooved portions 50A, 50B, 50C and 50D as illustrated in FIGURE 6.

The post 50 is slidably mounted in a bore in mounting block 52 but is held in adjusted position therein by the set screw 54 engaging the grooved post portion 50A. Exact adjustment may be accomplished when the apparatus is mounted on the pipe using the following technique. First, the set screw 54 is unlocked and the knurled screw-threaded abutment 56 is turned to engage and move the post 50 the desired amount after which the locked screw 54 is again locked. This adjustment is made without affecting the orientation of the roller 13 since the post 50, as illustrated in FIGURE 6, is prevented from turning about its axis due to the key member 58 coacting with the post grooved portion 50D, such key member 58 being slidably mounted with respect to such grooved portion 50D and being retained on the end of bolt 60 which has its head engaging a shouldered portion of block 52.

The block 52, in turn, is adjustably positioned on arcuate-shaped frame member 62 having an arcuate-shaped groove portion 62A therein. A similar frame member 63 is on the other side of the apparatus, as illustrated in FIGURE 2, for adjustably supporting like supporting blocks for rollers 14 and 15.

Each roller-supporting block is adjustably mounted as now described in relationship to FIGURES 1, 4 and 6. Thus, as shown in FIGURE 4, the roller-supporting block 52 has a tongue portion 52A slidably fitted in the grooved portion 62A. This grooved portion 62A is undercut to provide oppositely disposed shoulders for engagement with locking bar 66 into which the locking bolts 70 and 71 (FIGURES 1 and 6) are threaded.

Thus, the roller-supporting block 52 may be adjustably positioned using the following technique. First, the locking screws 70 and 71 are untightened to unlock the locking bar 66 from its normal engagement with the undercut grooved portion 62A, after which the block 52 is slid in the frame member 62 to the desired position and then the bolts 70 and 71 are retightened.

These two arcuate-shaped frame members 62 and 63, generally in the form of arcuate bars, are maintained in parallel spaced relation by two metal blocks 75 and 76 (FIGURE 2) as, for example, by fastening screws illustrated at 77 and 78 in FIGURE 1. The block 75 is solid and of smaller size than block 76 which is rectangularly apertured to provide a portion of an expansible water chamber in which a crystal transducer is mounted as described hereinafter in connection with FIGURES 4, 5 and 8.

A flanged insert member 82 is fitted within the rectangular apertured portion of the spacer block 76 and is fastened thereby by bolts 84. This insert member 82 has a rectangular apertured portion, as perhaps best seen in FIGURE 5, within which is snugly fitted the crystal or transducer 85 and, of course, its holder. A coaxial cable 86 passes through an apertured portion of the insert 82 and is connected to the crystal 85 by means of a conventional coaxial connector 88.

A rectangular tubular element 80 is slidably mounted within the rectangular apertured portion of block 76 and the same is normally biased outwardly by four coil compression springs 90 each having one end thereof bearing against the tubular element 80 and the other one of its ends, as shown in FIGURE 8, disposed in a bore 94 in member 82 and bearing against an adjustable stop 93 in such bore 94, in the form of a set screw threaded in such bore 94, the tubular element 80 being retained by two bolts 96 recessed in bore 95 in member 82 and threaded in the movable pipe-engaging tubular element 80.

This rectangular tubular element 80, which is thus spring-biased by springs 90, has an arcuate outer curved surface which conforms generally in radius with the radius of the pipe under inspection and, being spring-biased, forms walls of an expansible water chamber 99 in which the crystal 85 is immersed.

Water to chamber 99 is introduced through a conventional valve 100 which is adjustable to control generally the water pressure in chamber 99 and the amount of leakage of water therefrom, the valve 100 being adjusted to assure maintenance of a solid water column between the crystal and the pipe without too much water leakage. The valve 100 includes a threaded nipple portion which is threaded into a bushing 101 (FIGURES 1 and 5) in the wall of insert member 82, such bushing 82 being in communication with the chamber 99 through interconnecting passageways 102 and 103. The passageway 102 constitutes a bore in member 82 and passageway 103 is defined by adjacent circularly grooved portions in the rectangularly shaped portion 82A of insert member 82 and spacer block 76. Thus only the underside of the crystal, i.e. that side of the crystal facing the pipe is in contact with the water and forms a wall of the expansible chamber 99.

In order to gain convenient access to the crystal for installation and removable purposes, as occasion may demand, a removable circular cover member 105 is releasably secured as, for example, by bolts 84.

It will be noted that each of the rollers 12–15 and 17, 18, which provide the only contact with the pipe P, has its axis of rotation inclined or skewed with respect to the longitudinal axis of the pipe such that when the pipe P is rotated about its axis and the operator holds the device described to prevent it from turning with the pipe, the device is automatically moved rectilinearly in a direction parallel to the axis of the pipe with the result that the crystal 85 in effect traces a spiral path around the pipe, i.e. the outer surface of the pipe is spirally "scanned" by the crystal.

Further, the device described may be caused to be moved either to the right or to the left, depending upon preadjustment of the roller-supporting posts 50 (FIGURE 4) and support 40 (FIGURE 1) for rollers 17 and 18. Thus, instead of the set screw 54 (FIGURES 4 and 6) engaging the grooved portion 50A, the post 50 may be turned through 180 degrees to obtain a skewing in the opposite direction, after which the post 50 is locked by set screw 54 engaging the other grooved portion 50C and key 50D now in the other grooved portion 50B. Correspondingly the mounting block 40 is adjusted to achieve like skewing of the rotational axis of rollers 17, 18, after which the block 40 is again locked in position by retightening set screw 44.

Also, as mentioned previously, the series of holes 46 may be suitably marked to indicate which one to use for a particular diameter of pipe; likewise, suitable indicia (not shown) is inscribed on the arcuate frame member and cooperates with a portion of mounting blocks 52 to provide an indication as to where the same should be positioned for different diameters of pipe.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:
1. Apparatus for the inspection of metal pipe wherein a transducer is mounted to transmit energy pulses into the pipe and to receive resulting return echo signals therefrom, the combination comprising, a pair of jaw members for partially embracing said pipe, means interconnecting said jaw members, each of said jaw members having rollers rotatably mounted thereon for contacting the pipe, means on said one jaw member defining a water chamber having an open end which is closed by a portion of the pipe, and a crystal mounted on said one jaw member and within said chamber.

2. Apparatus as set forth in claim 1 in which said rollers have their axes of rotation inclined to make an acute angle with respect to the axis of said pipe such that relative movement between said pipe and said jaw members results in movement of said crystal in a spiral path around the axis of said pipe.

3. Apparatus as set forth in claim 1 in which said jaw members are pivotally interconnected and form a portion of a clamping structure for clamping said apparatus to said pipe, and means releasably locking said clamping structure on said pipe.

4. Apparatus as set forth in claim 1 in which means are provided on said jaw members for adjustably mounting said rollers thereon to conform to pipes of different diameter.

5. Apparatus as set forth in claim 2 including means for changing the direction in which said axes of rotation are inclined with respect to the axis of said pipe.

6. Apparatus as set forth in claim 1 in which said means defining a water chamber includes a tubular member mounted on said one jaw member, and means biasing said member into engagement with said pipe.

7. Apparatus as set forth in claim 1 in which one of said jaw members is arcuate in shape and has a pair of rollers spaced along the length thereof, and means adjustably positioning said pair of rollers to extend different distances within said arcuate jaw member.

8. Apparatus as set forth in claim 7 in which the other one of said jaw members comprises generally a straight bar having a roller mounted thereon.

References Cited in the file of this patent
UNITED STATES PATENTS

| | | |
|---|---|---|
| 2,378,237 | Morris | June 12, 1945 |
| 2,908,161 | Bincer | Oct. 13, 1959 |
| 2,956,185 | Von Stocker | Oct. 11, 1960 |